(12) United States Patent
Peng et al.

(10) Patent No.: US 10,581,333 B2
(45) Date of Patent: Mar. 3, 2020

(54) CONTROL METHOD OF CONSTANT-VOLTAGE-GAIN ISOLATION TYPE BIDIRECTIONAL FULL-BRIDGE DC/DC CONVERTER

(71) Applicant: Zhejiang University, Hangzhou, Zhejiang (CN)

(72) Inventors: Yonggang Peng, Zhejiang (CN); Xiaoming Wang, Zhejiang (CN); Wei Wei, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 16/395,210

(22) Filed: Apr. 25, 2019

(65) Prior Publication Data

US 2019/0372471 A1    Dec. 5, 2019

(30) Foreign Application Priority Data

Jun. 4, 2018   (CN) .......................... 2018 1 0565048

(51) Int. Cl.
*H02M 3/335* (2006.01)
*H02M 1/08* (2006.01)
*H02M 1/00* (2006.01)

(52) U.S. Cl.
CPC ......... *H02M 3/33584* (2013.01); *H02M 1/08* (2013.01); *H02M 2001/0016* (2013.01)

(58) Field of Classification Search
CPC ........ H02M 3/07; H02M 3/158; H02M 3/155; H02M 3/1582; H02M 3/28; H02M 3/156; H02M 3/337; H02M 3/335; H02M 3/33507; H02M 3/33592; H02M 3/33576; H02M 3/33569; H02M 3/33546; H02M 2001/0009; H02M 2001/0006; H02M 1/00; H02M 1/4255; H02M 1/08; H02M 7/12; H02M 7/48; H02M 3/33584
See application file for complete search history.

(56) References Cited

U.S. PATENT DOCUMENTS

| | | | | |
|---|---|---|---|---|
| 4,959,766 | A * | 9/1990 | Jain | H02M 1/4241 363/126 |
| 9,859,803 | B2 * | 1/2018 | Strzalkowski | H02M 3/33584 |
| 9,876,434 | B2 * | 1/2018 | Torrico-Bascope | H02M 3/33584 |
| 10,075,028 | B2 * | 9/2018 | Wu | H02J 17/00 |
| 10,340,809 | B2 * | 7/2019 | Boysen | H02M 3/33584 |

(Continued)

*Primary Examiner* — Jeffrey A Gblende
*Assistant Examiner* — Nusrat Quddus
(74) *Attorney, Agent, or Firm* — Wayne & Ken, LLC; Tony Hom

(57) ABSTRACT

The disclosure relates to power electronics technology and aims to provide a control method of constant-voltage-gain isolation type bidirectional full-bridge DC/DC converter, which is based on a single-phase-shifting modulation method. By enabling the difference between the M times of the input voltage and primary-referred value of the output voltage to be constantly zero, to realize the control goal that the ratio value between the primary-referred value of the output voltage and the input voltage is constantly M; the ratio value between the primary-referred value of the output voltage and the input voltage is defined as the voltage gain M, wherein an adjusting range is 0.5~2; through introducing a feedforward compensator involving the input and output voltages and the input and output currents, a linear controller of the system is implemented.

2 Claims, 3 Drawing Sheets

(56) References Cited

U.S. PATENT DOCUMENTS

2011/0317452 A1* 12/2011 Anguelov ......... H02M 3/33584
363/21.02
2013/0301306 A1* 11/2013 Hosotani ............... H02M 3/338
363/21.02
2015/0155095 A1* 6/2015 Wu ........................ H02J 17/00
307/104

* cited by examiner

CONTROL METHOD OF CONSTANT-VOLTAGE-GAIN ISOLATION TYPE BIDIRECTIONAL FULL-BRIDGE DC/DC CONVERTER

CROSS-REFERENCE TO RELATED APPLICATIONS

This application claims the benefit of priority from Chinese Patent Application No. CN201810565048.5, filed on Jun. 4, 2018. The content of the aforementioned application, including any intervening amendments thereto, is incorporated herein by reference in its entirety.

TECHNICAL FIELD

The disclosure relates to a control method of a constant-voltage-gain isolation type bidirectional full-bridge DC/DC converter, and belongs to power electronics technology.

BACKGROUND OF THE INVENTION

The direct-current (DC) distributed power generation system is increasingly popular due to its characteristics of high-efficiency and easy-to-control. DC power distribution and AC/DC hybrid power distribution is a trend of development in the future. The DC transformer is a key device for DC power distribution. The isolation type bidirectional full-bridge DC/DC converter is a typical scheme of a DC transformer, duo to its benefits of a symmetric structure, a bidirectional power transmission capability, and the soft switching is easy to realize and the like. The isolation type bidirectional full-bridge DC/DC converter is an important device for achieving the voltage level conversion and the galvanic isolation in a DC power distribution system.

When the isolation type bidirectional full-bridge DC/DC converter is applied to a DC power distribution system and used as a DC transformer, it can easily access the DC distributed generations. However, due to the intermittent and random characteristics of the distributed generations and the fluctuation of loads, the system may alter between the following two working conditions. One condition is that the high-voltage-side sub-network provides voltage support to the low-voltage-side sub-network, the other condition is that the low-voltage-side sub-network provides voltage support to the high-voltage-side sub-network. At the circumstance, a corresponding port voltage control strategy needs to be designed for the isolation type bidirectional full-bridge DC/DC converter. The traditional port voltage control method commonly controls the voltage at the high-voltage side or the low-voltage side to be constant. However, by this method, to achieve mutual voltage support between the two sub-networks of high and low voltage, one should design two voltage controllers of high and low voltage, and switch between the two controllers according to the system states. However, monitoring the system states can increase the system complexity, the cost is also increased, and the system stability may degrade due to the controller switching.

The disclosure aims at the situation that mutual voltage support may be carried out between the high and low voltage sides, and designs a constant-voltage-gain isolation type bidirectional full-bridge DC/DC converter. With a unified control mode, it establishes a seamless connection between the high and low DC networks, and can play an important role in the development of DC power distribution.

SUMMARY OF THE INVENTION

The technical problem to be solved by the disclosure is to overcome the defects in the prior art, and the disclosure provides a control method of a constant-voltage-gain isolation type bidirectional full-bridge DC/DC converter.

In order to solve the technical problem, the disclosure provides a technical solution:

A control method of a constant-voltage-gain isolation type bidirectional full-bridge DC/DC converter, the method is realized on the single-phase-shifting (SPS) modulated isolation type bidirectional full-bridge DC/DC converter with the structure:

The converter has an isolation transformer T with an turn ratio of n:1, a primary side H bridge which is formed by four switches, and the other four switches form a secondary side H bridge; two sides of the isolation transformer T are respectively connected by a primary side resonant tank composed of a resonant inductor $L_{r1}$ and a resonant capacitor $C_{r1}$, and a secondary side resonant tank composed of a resonant inductor $L_{r2}$ and a resonant capacitor $C_{r2}$; the converter is also provided with an input-port DC bus capacitor $C_1$, and provided with an output-port DC bus capacitor $C_2$;

The single-phase-shifting (SPS) modulation method of the DC/DC converter comprises: in a switching cycle of the DC/DC converter, though turning on/off the switches of the primary side H bridge, a square wave voltage $u_{ab}$ with the duty ratio of 0.5 is generated between the midpoints of two bridge legs of the primary-side H bridge; in the same way, a square wave voltage $u_{cd}$ with the duty ratio of 0.5 is generated in between the midpoints of two bridge legs of the secondary-side H bridge; through shifting the phase angle $\varphi$ that the midpoint voltage $u_{ab}$ of the two bridge legs of the primary-side H bridge leads the midpoint voltage $u_{cd}$ of the two bridge legs of the secondary-side H bridge, so that the power transmission of the DC/DC converter is adjusted.

The disclosure further provides an isolated bidirectional full-bridge DC/DC converter constant-voltage-gain control method based on the SPS modulation method mentioned above, wherein by enabling the difference between the M times of the input voltage and the primary-referred value of the output voltage to be constantly zero, to realize the control goal that the ratio value between the primary-referred value of the output voltage and the input voltage is constantly M; the ratio value between the primary-referred value of the output voltage and the input voltage is defined as the voltage gain M, wherein an adjusting range is 0.5~2; through introducing a feedforward compensator involving the input and output voltages and the input and output currents, a linear controller of the system is implemented.

In the disclosure, the constant-voltage-gain control method specifically comprises the following steps:

(1) measuring an input voltage $u_1$, an input current $i_1$, an output voltage $u_2$ and an output current $i_2$ of the converter, and filtering the measured signals through a low-pass filter $G_f$ to obtain the corresponding filtered values $u_{1f}$, $i_{1f}$, $u_{2f}$, $i_{2f}$;

(2) a difference is made between M times of $u_{1f}$ and n times of $u_{2f}$ (that is the primary-referred value of $u_{2f}$), wherein n is the turn ratio of the isolation transformer T; and then inputting an inverse of the difference into a PI controller which has a frequency domain expression of $K_P+K_I/s$, and an intermediate control quantity $\theta$ is obtained through the calculation of the PI controller; the calculation formula of the intermediate control quantity $\theta$ is:

$$\theta = \left(K_P + \frac{K_I}{s}\right)[0 - (Mu_{1f} - nu_{2f})] \quad (1)$$

In the above formula, $K_P$ and $K_I$ respectively refer to the proportion coefficient and integral coefficient of the PI controller, and s refers to the Laplace operator;

(3) by performing feedforward compensation on θ through four filtered values $u_{1f}$, $i_{1f}$, $u_{2f}$, $i_{2f}$, the phase shifting angle φ between the square wave voltages $u_{ab}$ and $u_{cd}$ can be obtained; calculation manner of the phase shifting angle φ is as follows:

$$\varphi = K \frac{-C_1 C_2 \theta + MC_2 i_{1f} + nC_1 i_{2f}}{nC_1 u_{1f} + MC_2 u_{2f}} \quad (2)$$

in the formula, $C_1$, $C_2$ are the input-port and output-port capacitances respectively; and a constant coefficient K is obtained through calculation according to the following formula:

$$K = \frac{\pi^2 [C_{r1} C_{r2} w_s^2 (n^2 L_{r2} + L_{r1}) - n^2 C_{r1} - C_{r2}]}{8nC_{r1} C_{r2} w_s}, \quad (3)$$

wherein $C_{r1}$, $C_{r2}$ are capacitances of a resonant capacitor of the primary side and a resonant capacitor of the secondary side respectively, $L_{r1}$, $L_{r2}$ are inductances of a resonant inductor of the primary side and a resonant inductor of the secondary side respectively, $w_s$ is a switching angular frequency.

In the disclosure, the physical significance of the voltage gain M is that: in an isolated bidirectional full-bridge DC/DC converter, DC voltage amplification factor which is brought by the part other than high-frequency transformer. In general, M is taken as 1, the DC voltage amplification factor is only provided by a high-frequency transformer, and at the moment, the circulation current in the converter is small, both of the primary and secondary side switches can achieve zero-voltage soft switching, which brings high system efficiency high. In order to flexibly adjust the voltage, M can also be properly adjusted, such as an optional adjustment range of 0.5-2.

Compared with current technology, the beneficial effects of the disclosure:

(1) According to the constant-voltage-gain control method provided by the disclosure, it realizes mutual voltage support and bidirectional power flow between the sub-networks at high and low voltage sides, which establishes a seamless connection between the high and low DC network, and improves the performance of the DC distribution network.

(2) Voltage match between the high and low voltage ports of the isolation type bidirectional full-bridge DC/DC converter can be guaranteed in different working conditions. Voltage support and stable control can be achieved on the whole DC distribution network as long as any side is provided with the voltage-support source, which imitates the function of the AC transformer, reduces the control difficulty of the multi-voltage-level DC distribution network, and achieves high-quality DC power supply.

(3) The disclosure introduces a feedforward compensator involving the input and output voltages and the input and output currents, to realize the linear control of the system, so that parameters of the controller are easy to design, and the control performance is excellent.

DETAILED DESCRIPTION OF EMBODIMENTS

Figure 1:
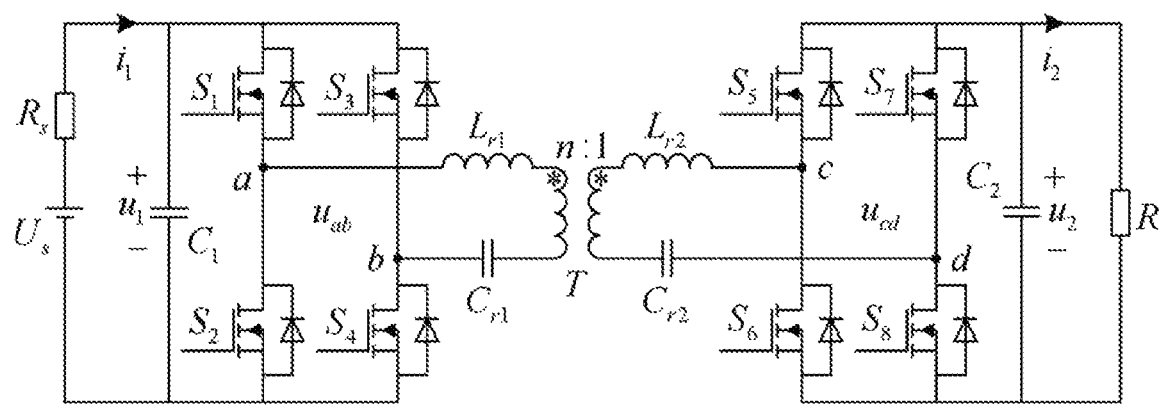
FIG. 1 is a topological diagram of an isolated bidirectional full-bridge DC/DC converter.

The disclosure is described in further detail below with reference to the drawings:

The topology diagram of the isolation type bidirectional full-bridge DC/DC converter is shown in FIG. 1.

The main body of the DC/DC converter includes: an isolation transformer T with a turn ratio of n:1, primary and secondary sides H bridges which are composed of switches $S_1$, $S_2$, $S_3$, $S_4$, $S_5$, $S_6$, $S_7$, $S_8$, primary and secondary sides resonant tanks which are composed of $L_{r1}$, $C_{r1}$, $L_{r2}$, $C_{r2}$ and input and output DC bus capacitors $C_1$, $C_2$. In order to verify the effectiveness of the control method of the disclosure, in the example system, the input side of the DC/DC converter is connected with a voltage source $U_s$ with an internal resistance $R_s$, and with a load resistor R in the output side of the DC/DC converter.

The single-phase-shifting modulation method of the isolated bidirectional full-bridge DC/DC converter includes the following steps: in one switching cycle, during first half of the switching cycle, turn on switches $S_1$ and $S_4$, and turn off the switches $S_2$ and $S_3$; during another half of the switching cycle, turn off the switches $S_1$ and $S_4$, and turn on the switches $S_2$ and $S_3$. At the moment, the waveform of the voltage $u_{ab}$ between the midpoints of the two bridge legs of the primary-side H bridge is a square wave with the duty ratio of 0.5. In a same way, through turning on/off the switches $S_5$, $S_6$, $S_7$, $S_8$, a square wave voltage $u_{cd}$ with the duty ratio of 0.5 is generated between the midpoints of the two bridge legs of the secondary-side H bridge. Through controlling that the turn-on time of $S_1$ and $S_4$ in a switching cycle leads or lags that of $S_5$ and $S_8$, the phase shifting angle φ that $u_{ab}$ leads $u_{cd}$ can be adjusted, and therefore the power transmission of the DC/DC converter can be adjusted.

Figure 2:
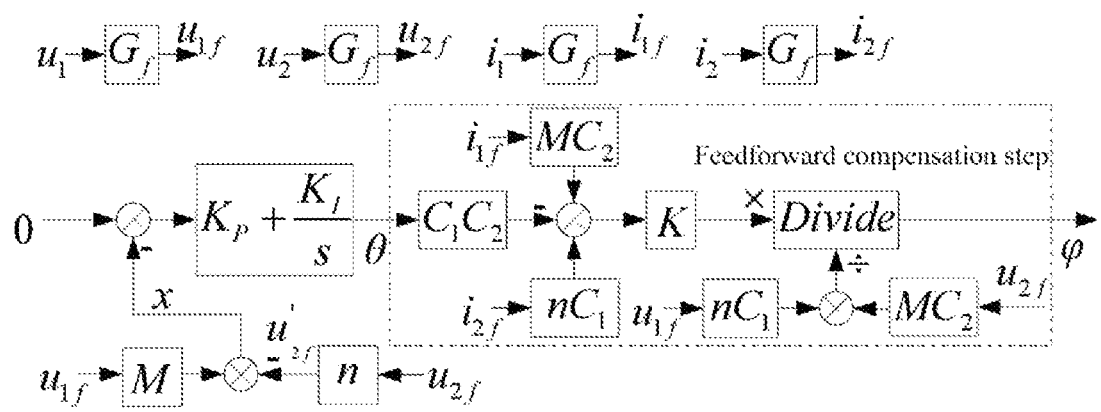
FIG. 2 is a control block diagram of a constant-voltage-gain control method.

A control block diagram of the constant-voltage-gain control method of the isolated bidirectional full-bridge DC/DC converter is shown in FIG. 2, wherein the specific implementation steps are as follows:

(1) measuring input voltage $u_1$, input current $i_1$, output voltage $u_2$ and output current $i_2$, and filtering the measured signals through a low-pass filter $G_f$ to obtain the corresponding low-frequency components $u_{1f}$, $i_{1f}$, $u_{2f}$, $i_{2f}$.

(2) through a fundamental harmonic approximation method, neglecting the losses, and calculating to obtain an approximate low-frequency component of the power transmitted from the primary side to the secondary side of the transformer T:

$$P = \frac{8nC_{r1} C_{r2} w_s u_{1f} u_{2f} \varphi}{\pi^2 [C_{r1} C_{r2} w_s^2 (n^2 L_{r2} + L_{r1}) - n^2 C_{r1} - C_{r2}]} \quad (4)$$

(3) selecting $x = Mu_{1f} - nu_{2f}$ to be a state variable, wherein the system state equation can be written as:

$$\frac{dx}{dt} = M \frac{du_{1f}}{dt} - n \frac{du_{2f}}{dt} = \frac{M}{C_1}\left(i_{1f} - \frac{P}{u_{1f}}\right) - \frac{n}{C_2}\left(-i_{2f} + \frac{P}{u_{2f}}\right) \quad (5)$$

(4) letting $$\varphi = K \frac{-C_1 C_2 \theta + MC_2 i_{1f} + nC_1 i_{2f}}{nC_1 u_{1f} + MC_2 u_{2f}} \quad (6)$$

wherein the constant coefficient K is obtained through calculation in the following manner:

$$K = \frac{\pi^2 [C_{r1} C_{r2} w_s^2 (n^2 L_{r2} + L_{r1}) - n^2 C_{r1} - C_{r2}]}{8nC_{r1} C_{r2} w_s} \quad (7)$$

and substituting the formula (4) and (6) into a formula (5), then getting $$\frac{dx}{dt} = \theta \quad (8)$$

From the equations (8), it can be known that there is linear relationship between θ and x. Through inputting an error between 0 and x into PI controller, an intermediate control quantity θ is calculated and obtained, and performing feedforward compensation by substituting θ, $u_{1f}$, $i_{1f}$, $u_{2f}$, $i_{2f}$ into formula (6) to obtain φ, the linear control of the system can be realized, wherein the calculation formula of θ is as follows:

$$\theta = \left(K_P + \frac{K_I}{s}\right)[0 - (Mu_{1f} - nu_{2f})] \quad (9)$$

In the above formula, $K_P$ and $K_I$ respectively refer to the proportion coefficient and integral coefficient of the PI controller, and s refers to the Laplace operator; $K_P$ and $K_I$ coefficients can be determined by a PID parameter tuning method.

Figure 3:
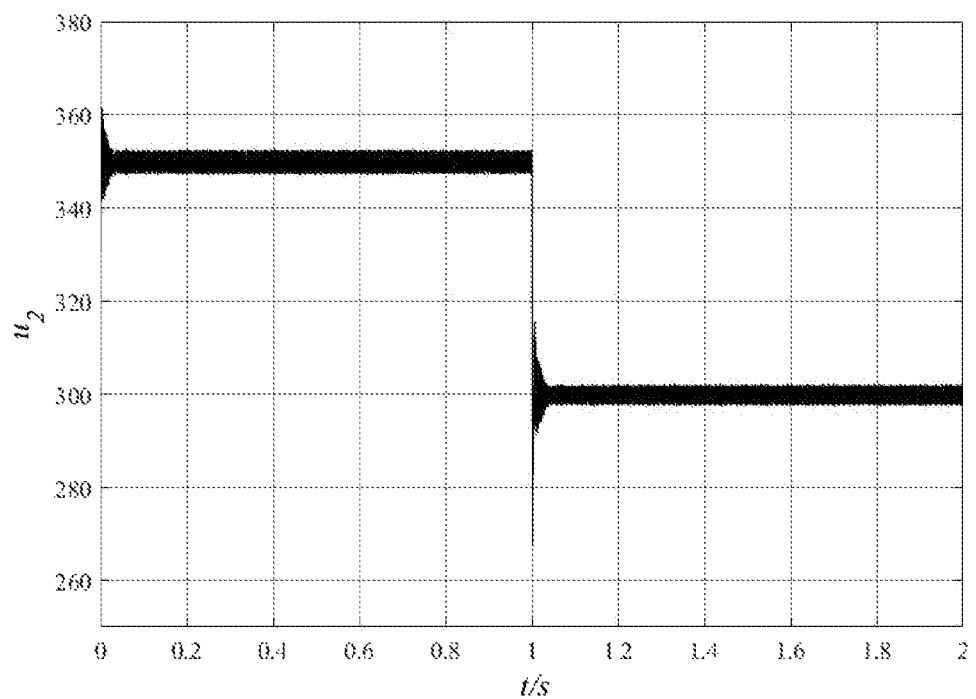
FIG. 3 is an output voltage waveform.

The effect of the constant-voltage-gain control method of an isolated bidirectional full-bridge DC/DC converter can be illustrated by FIG. 3. The transformer turn ratio n is 2 in the example system, and the voltage gain M is 1, when the voltage of the power supply $U_s$ is changed from 700V to 600V, the output voltage is $U_2$ automatically changed from 350V to 300V, and the constant-voltage-gain control is achieved.

The above descriptions are only preferred embodiments of the disclosure, and it should be noted that without departing from the technical principle of the disclosure, a plurality of improvement and deformation can be made, and the improvement and the deformation are also considered as the protection scope of the disclosure.

What is claimed is:

1. A control method of a constant-voltage-gain isolation type bidirectional full-bridge DC/DC converter, wherein the method is realized on a single-phase-shifting (SPS) modulated isolation type bidirectional full-bridge DC/DC converter with the structure that:
   the converter has an isolation transformer T with a turn ratio of n:1, a primary side H bridge is formed by four switches, and the other four switches form a secondary side H bridge;
   two sides of the isolation transformer T are respectively connected by a primary side resonant tank composed of a resonant inductor $L_{r1}$ and a resonant capacitor $C_{r1}$, and a secondary side resonant tank composed of a resonant inductor $L_{r2}$ and a resonant capacitor $C_{r2}$; the converter is also provided with an input-port DC bus capacitor $C_1$, and is provided with an output-port DC bus capacitor $C_2$;
   a single-phase-shifting (SPS) modulation method of the DC/DC converter comprises: in a switching cycle of the DC/DC converter, though turning on/off the switches of the primary side H bridge, a square wave voltage $u_{ad}$ with the duty ratio of 0.5 is generated between the midpoints of two bridge legs of the primary-side H bridge; in the same way, a square wave voltage $u_{cd}$ with the duty ratio of 0.5 is generated in between the midpoints of two bridge legs of the secondary-side H bridge; through shifting the phase angle φ that the midpoint voltage $u_{ab}$ of the two bridge legs of the primary-side H bridge leads the midpoint voltage $u_{cd}$ of the two bridge legs of the secondary-side H bridge, so that the power transmission of the DC/DC converter is adjusted,
   wherein a ratio M between a primary-referred value of the output voltage and the input voltage is maintained to be constant by enabling a difference between the M times of the input voltage and primary-referred value of the output voltage to be constantly zero; wherein the ratio M is in an adjusting range of 0.5~2; through introducing a feedforward compensator involving the input and output voltages and the input and output currents, a linear controller of the system is implemented.

2. The method according to claim 1, wherein the constant-voltage-gain control method further comprises:
   (1) measuring an input voltage $u_1$, an input current $i_1$, an output voltage $u_2$ and an output current $i_2$ of the converter, and filtering the input voltage $u_1$, the input current $i_1$, the output voltage $u_2$ and the output current $i_2$ through a low-pass filter $G_f$ to obtain filtered values $u_{1f}$, $i_{1f}$, $u_{2f}$, $i_{2f}$ respectively;
   (2) a difference is made between M times of $u_{1f}$ and n times of $u_{2f}$ (that is the primary-referred value of $u_{2f}$), wherein n is the turn ratio of the isolation transformer T; and then inputting an inverse of the difference into a PI controller which has a frequency domain expression of $K_P+K_I/s$, and an intermediate control quantity θ is obtained through the calculation of the PI controller; a calculation formula of the intermediate control quantity θ is:

$$\theta = \left(K_P + \frac{K_I}{s}\right)[0 - (Mu_{1f} - nu_{2f})] \quad (1)$$

in the above formula, $K_P$ and $K_I$ respectively refer to the proportion coefficient and integral coefficient of the PI controller, and s refers to a Laplace operator;
   (3) by performing feedforward compensation on θ through four filtered values $u_{1f}$, $i_{1f}$, $u_{2f}$, $i_{2f}$, the phase shifting angle φ between the square wave voltages $u_{ab}$ and $u_{cd}$ can be obtained; calculation manner of the phase shifting angle φ is as follows:

$$\varphi = K \frac{-C_1 C_2 \theta + MC_2 i_{1f} + nC_1 i_{2f}}{nC_1 u_{1f} + MC_2 u_{2f}} \quad (2)$$

in the formula, $C_1$, $C_2$ are respectively the input-port and output-port capacitances; and a constant coefficient K is obtained through calculation according to the following formula:

$$K = \frac{\pi^2 [C_{r1} C_{r2} w_s^2 (n^2 L_{r2} + L_{r1}) - n^2 C_{r1} - C_{r2}]}{8 n C_{r1} C_{r2} w_s}, \qquad (3)$$

wherein $C_{r1}$, $C_{r2}$ are capacitances of a resonant capacitor of the primary side and a resonant capacitor of the secondary side respectively, $L_{r1}$, $L_{r2}$ are respectively inductances of a resonant inductor of the primary side and a resonant inductor of the secondary side, $w_s$ is a switching angular frequency.

* * * * *